United States Patent [19]

Rodaway et al.

[11] Patent Number: 5,707,411
[45] Date of Patent: Jan. 13, 1998

[54] FRAMELESS MONOLAYER AIR REGISTER FILTER

[76] Inventors: Doreen Rodaway, 4744 S. Garland St., Littleton, Colo. 80123; Dixie Schwartz, 7137 S. Cherry St., Littleton, Colo. 80122

[21] Appl. No.: 783,823

[22] Filed: Jan. 13, 1997

Related U.S. Application Data

[63] Continuation-in-part of Ser. No. 348,494, Dec. 2, 1994, abandoned.
[51] Int. Cl.⁶ ..................................... B01D 39/18
[52] U.S. Cl. .................. 55/496; 55/505; 55/DIG. 35
[58] Field of Search ........................ 55/495, 496, 527, 55/528, DIG. 35, 505

[56] References Cited

U.S. PATENT DOCUMENTS 5,240,487  8/1993  Kung ............................ 55/486

Primary Examiner—David W. Wu

[57] ABSTRACT

A nonwoven needlepunched polyester batt of single monolayer construction is cut to a dimension slightly larger or smaller than the dimension of an interior warm air register, and fitted into the plenum of the heating system by compression or by stretching, as the case may be. The batt is integral, having no pockets or chambers therein. The filter has no frame, as the nonwoven batt has sufficient rigidity in relation to its weight to remain in place in the plenum, and is kept against the air register by the flow of air through the duct system, thereby filtering air flow.

2 Claims, 1 Drawing Sheet

FRAMELESS MONOLAYER AIR REGISTER FILTER

This application is a continuation in part of prior application 08/348,494, filed Dec. 2, 1994, now abandoned and claims priority therefrom.

BACKGROUND OF THE INVENTION

This invention relates to air filters in general and in particular relates to a system for the custom fabrication of frameless air filters, interior decoration screens and air treatment installations that are installed at air registers in heating, ventilation and air conditioning duct lines.

A common problem in homes and offices is that of keeping light colored interior surfaces clean, including walls, window treatments and carpets or rugs. A major contributor to the problem is that of airborne particulates that are conveyed along by the flow of air through heating, ventilation and air conditioning (HVAC) systems. Such particulates, including dust, molds, pollens and the like will, with time, cause a noticeable buildup of dirty-looking surfaces in the immediate area of the air registers that exhaust air into a room. The air registers themselves will become quite dirty and are difficult to clean out, owing to the multiple narrow louvers and vents. Additionally, the air register is not particularly pleasant to look at, since it is backed up by the dark interior of a duct that is generally made out of sheet metal that has probably become very dusty and dirty itself.

The most common type of filter for HVAC systems is installed in a frame that is inserted into a frame mount at some point in the system very close to where the cold air return joins to the furnace, air conditioner or blower. The disadvantage of this is that one relatively inadequate filter is being forced to try to filter all air that will be conducted through the entire system. Such a central filter can't do anything about dirt or dust already in other parts of the system downstream from the furnace, air conditioner or blower. Thus, there is a need for a way of effectively filtering air at the far points of the system, prior to air entry into the interior of a room.

An additional problem with conventional type air filters that are installed close to a heating unit, ventilation unit or air conditioning unit is that a great number of pre-fabricated sizes must be kept in inventory, since such filters rely on a rigid frame that must fit into some pre-dimensioned frame holder. This represents an additional cost for a dealer or maintenance firm.

It is therefore an object of the present invention to provide for a frameless air filter that decreases the influx of airborne particulates into a room from an air register with greater efficiency than filters mounted close to a heating unit, ventilation unit or air conditioning unit. Another object of the present invention is to provide for a method of installing such filters in such air conduit systems. Another object of the invention is to significantly reduce inventory costs by eliminating the need for multiple sizes of pre-sized air filters. It is another object of the present invention to provide for a method of improving the appearance of air registers, both exhaust air registers and intake air registers.

The present invention accomplishes these objects by providing for a non-woven single monolayer fibrous batt that is cut to fit behind a room air register, and simply fitted into the plenum of the air duct behind the register.

SUMMARY OF THE INVENTION

In summary, the invention is a unitary, single monolayer construction, nonwoven fibrous batt of predetermined thickness, the batt being cut to a predetermined length and width, the batt being compactable when compressed and being expandable when stretched, such that the batt can be compressed widthwise and lengthwise into a heating, ventilation or air conditioning system duct plenum that is smaller in size than the batt, and such that the batt can be expanded widthwise and lengthwise into a heating, ventilation or air conditioning system duct plenum that is larger in size than the batt, the batt having no support frame members and the batt having no pockets in its single monolayer construction, the batt being inserted into the plenum of said duct into a position that is adjacent to an air register of said duct and substantially coplanar with the plane of said register.

The frameless air filter comprising the nonwoven fibrous batt has sufficient compaction so as to allow air to pass freely through the batt with minimum velocity reduction. Also within the invention is a method of filtering air flow into the interior of a room, keeping air registers clean and improving the appearance of air registers, comprising the steps of: removing an interior air duct register from a normal planar installed position of said register at an end of a heating, ventilation or air conditioning duct so as to give access to the plenum of said duct; cutting a nonwoven fibrous batt having sufficient compaction so as to allow air to pass freely through said batt with minimum velocity reduction, said batt being cut to a predetermined size that is greater than the size of said duct but said size also being sufficiently small so as to allow air to pass freely through said batt with minimum velocity reduction when said batt is inserted into the plenum of said duct or which is smaller in size than the size of said duct, but said size capable of being stretched in width and length so as to fit against the walls os the duct, and inserting said batt into the plenum of said duct into a position that is adjacent to and substantially in the same plane as said register, such that said batt remains in substantially the same position by frictional force against the walls of said duct; and replacing said register.

DETAILED DESCRIPTION OF THE PREFERRED EMBODIMENTS

Figure 1:
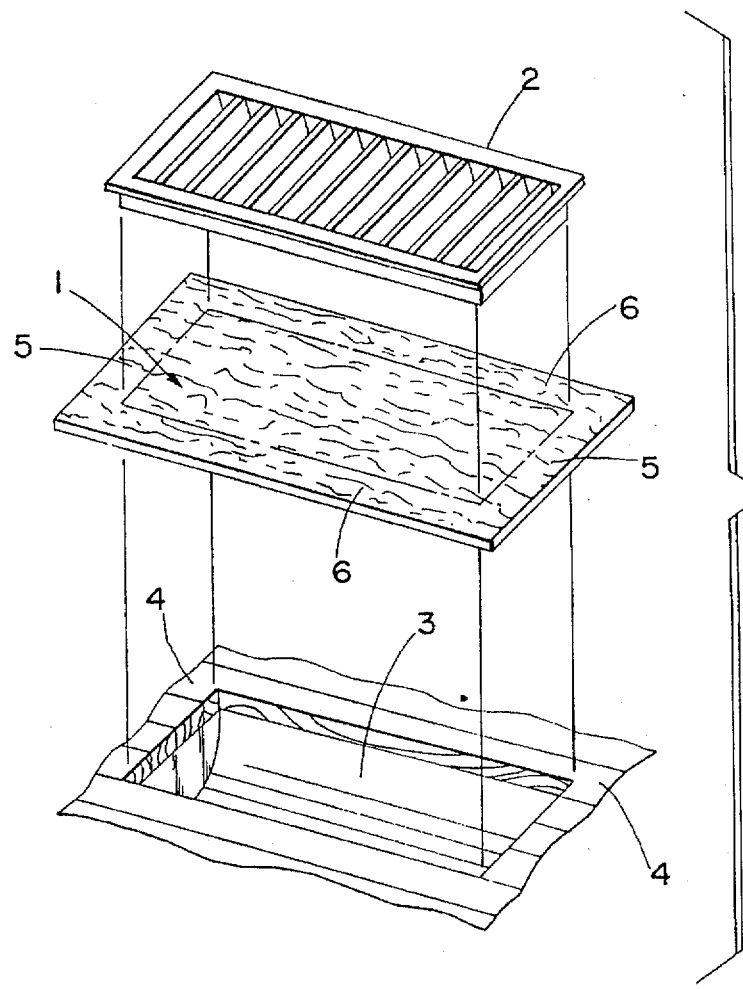
FIG. 1 is an exploded perspective view showing how the air filter is fitted into an air duct behind a typical air register.
Figure 2:
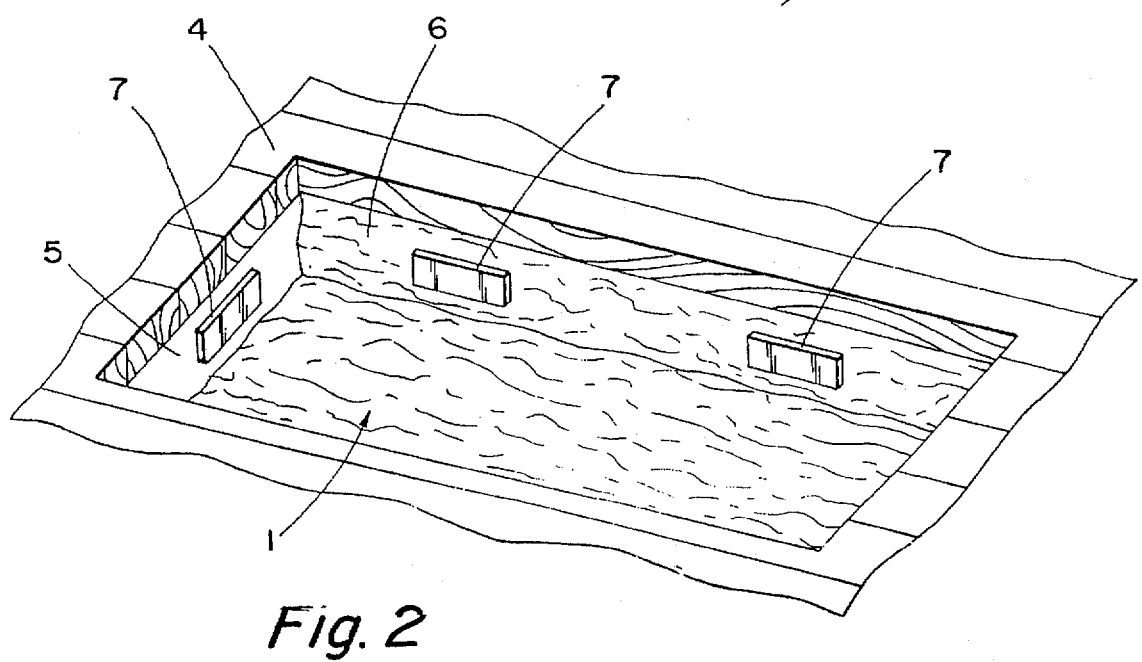
FIG. 2 is a perspective view showing part of an installed air filter with its side panels folded upwards to fit around the flanges of an air register.

The invention here centers around the use of a single monolayer batt of fibrous material. A batt is commonly made by carding a group of fibers of preselected average length. After fibers are produced, whether natural or synthetic, the carding process combs the fibers into a batt. The preferred material for the filter of the present invention is a nonwoven batt of fibrous material, preferably polyester, which has been needle punched. Polyester is especially preferable since it is relatively non-allergenic, washable, and relatively non-flammable. Other suitable fibers include polypropylene, aryl amides, aryl imides, cotton, wool, and so forth. The technique of needle punching is well known to those of ordinary skill in the non-woven textiles art. In needle punching, an array of parallel-mounted barbed needles that have been mounted into an oscillating board is pulled in and out of a batt of fibrous material. The fibers may have an average fiber length of from one to ten centimeters. The barbs on the needles engage individual fibers of the batt as the needle punching apparatus oscillates, so the barbs then cause the fibers to intermingle and interengage, having the overall effect on the batt of compressing it, strengthening it and giving it a uniform hand feel and appearance. It is important that the batt be needle punched so as to confer structural rigidity on the batt that will enable it to hold its position in the air duct plenum, but also that it not be needle punched and compacted too much, as the filter must permit a relatively unimpeded flow of air through the filter. Methods of controlling needle punching so as to confer differing degrees of compaction to a batt are well known to those of ordinary skill in the textile arts and are not part of the invention as claimed here. The batt used in the present invention is a single monolayer construction of non-woven fibers, unlike air duct filters of the prior art which may be constructed of more than one layer. The single batt monolayer construction also is to be understood to be free of pockets or holding cavities, unlike filters of the prior art which can contain such a pocket that can be used for containing a scent-releasing device or the like. The present invention has no such pocket and uses no such scent releasing means.

The single monolayer construction relies for its structural rigidity strictly on the properties of the non-woven fibers that comprise the batt. There are no external or secondary support members or structural frame means of any kind that give the batt rigidity or hold it against the walls of a duct.

In its embodiment as a decorative panel for dressing up air registers, the batt can be textured through the needle punch process to achieve a variety of topical textures, such as jacquard patterns and so forth in any desired geometric or non-geometric pattern. Such an embossed or textured panel will add a more esthetically pleasing decorative effect to an ordinary air register. Installation of a decorative air register panel follows the same procedure as outlined below for the invention as an air filtration or treatment device.

In one preferred embodiment of the invention, an air register 2 is removed and a non-woven batt 1 of polyester fiber is cut from a stock roll or panel to a dimension that is approximately one to one and a half inches longer and wider than the opening 4 of a duct 3 that is to be treated. We have found that this optimizes the size of the batt so that it is not pushed too tightly into the duct plenum so as to impede air flow through the batt. Additionally, cutting the filter from a stock roll or panel conserves inventory so that only one size needs to be kept on hand. The batt is pushed into the duct 3 which causes the sides of the batt to form in situ flaps or flanges, 5 and 6. The filters of the present invention have no supporting frame, as we have additionally discovered that when the filter is installed adjacent the the exhaust air register, the outwards flow of air keeps the filter in place against the register. In those air registers of the type that have downwardly or inwardly disposed flanges, those flanges additionally have the effect of compressing against the flaps 5 and 6, conferring additional holding ability.

Unlike most filters, the filters of the invention can be machine washed to rid them of accumulated particulate dirt, and then re-installed.

While the invention has been described and illustrated with reference to certain preferred embodiments thereof, those skilled in the art will appreciate that various changes, modifications and substitutions can be made therein without departing from the spirit and scope of the invention. It is especially to be noted that the invention is not to be limited to any one given fiber material, as it is not important what type of fiber is being used as long as it has been a needle punched nonwoven batt having sufficient air flow properties. It is intended, therefore, that the invention be limited only by the scope of the claims which follow, and that such claims be interpreted as broadly as possible.

What is claimed is:

1. An air filter comprising:

a unitary, single monolayer construction, nonwoven fibrous batt of predetermined thickness, said batt being cut to a predetermined length and width, said batt being compactable when compressed and being expandable when stretched, such that said batt is compressible widthwise and lengthwise into a heating, ventilation or air conditioning system duct plenum that is smaller in size than said batt, and such that said batt is expandable widthwise and lengthwise into a heating, ventilation or air conditioning system duct plenum that is larger in size than said batt, said batt having no support frame members and said batt having no pockets in its single monolayer construction;

said batt being inserted into the plenum of said duct into a position that is adjacent to an air register of said duct and substantially coplanar with the plane of said register.

2. The filter as claimed in claim 1, which can be re-used after washing said filter of accumulated airborne particulate dirt.

* * * * *